UNITED STATES PATENT OFFICE.

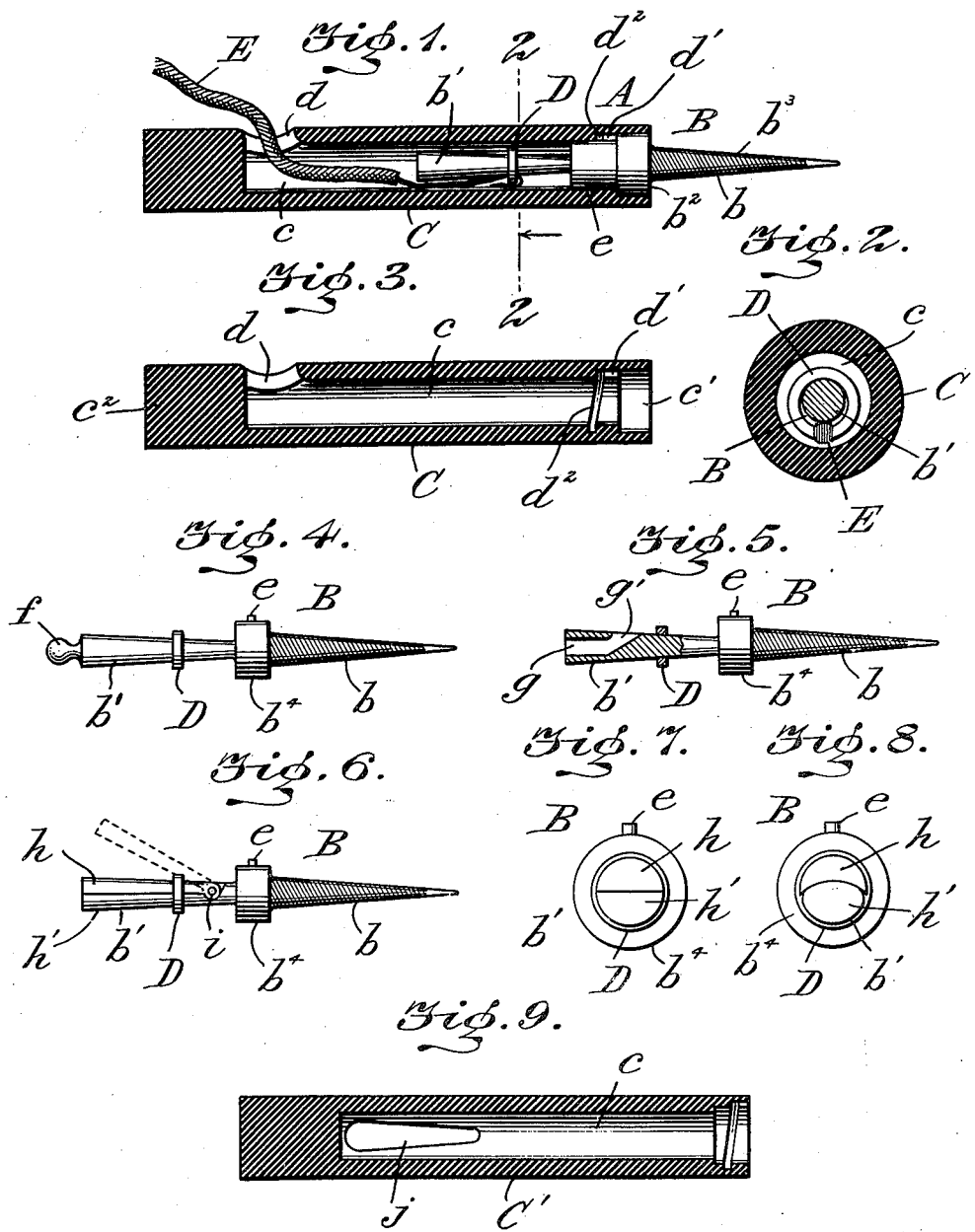

HARRY HOUSE MORRELL, OF NEW YORK, N. Y.

CURRENT-TESTING DEVICE.

944,271.	Specification of Letters Patent.	Patented Dec. 28, 1909.

Application filed September 22, 1908. Serial No. 454,204.

*To all whom it may concern:*

Be it known that I, HARRY HOUSE MORRELL, a citizen of the United States, residing in the city of New York, borough of Manhattan, county and State of New York, have invented a certain new and useful Current-Testing Device, of which the following is a specification.

This invention is an electrical current testing and connecting device or implement, the function of which is to determine the presence of an electric current in a circuit, and it is available, also, for use in conjunction with electrical measuring instruments for determining the voltage or amperage of a current, but it will be apparent from the description hereinafter given that the device is capable of use for many purposes in the electrical art.

In one aspect, the invention consists of a stem of conducting material, said stem being secured to a handle, and means normally connected with said stem whereby an electric current may pass therethrough.

The device is simple in construction and operation, and provides a means whereby electrical connections, for the purposes stated, may be readily and effectually made. As will hereinafter appear, the conducting stem may be made in various forms, but the form which I prefer to use, consists of a tapering stem adapted to be connected with one of the conductors of a circuit, and means, preferably in the form of a ring, for securing efficient electrical contact between said conductors.

In using the device in connection with electrical measuring instruments, two of the implements are employed, one connected with each conductor of a circuit, and the points of the stems thereafter applied to the binding posts of the measuring instrument, thereby enabling the current to be sent through said instrument with ease and safety.

In the accompanying drawings, I have illustrated different practical embodiments of the invention, but the constructions shown therein are to be understood as illustrative, only, and not as defining the limits of the invention.

Figure 1 is a longitudinal section, partly in elevation, of a current testing device embodying the present invention. Fig. 2 is a vertical cross section, on an enlarged scale, the plane of section being indicated by the dotted line 2—2 of Fig. 1. Fig. 3 is a longitudinal section through the handle of the device, with the stem disconnected therefrom. Figs. 4, 5 and 6 are views in side elevation of other forms of current conducting stems embodying the invention. Fig. 7 is an end view, on an enlarged scale, of the divided portion of the stem shown in Fig. 6. Fig. 8 is an end view of a modification of the device shown in Fig. 7, and Fig. 9 is a longitudinal section of another embodiment of the handle.

The device, A, shown in Figs. 1, 2 and 3 of the drawings comprises a current conducting stem, B, and a handle, C, the latter being composed of insulating material, and substantially inclosing a portion of said stem, B. The stem, B, is composed of current conducting or carrying material, preferably metal, and in one embodiment of the invention said stem consists of members, $b, b'$, and a head, $b^2$, said members and head being integral. Member, $b$, of the stem tapers to a point, and it is provided with a roughened exposed surface, $b^3$, somewhat similar to the surface of a file, whereby the device or implement may be used in cleaning or abrading a metallic surface preliminarily to the application of the point, $b$, to said cleaned surface in order to secure good metallic and electrical contact therewith. Member, $b'$, of stem, B, extends in an opposite direction to head, $b^2$, from member, $b$, and in the several forms of the invention this member, $b'$, is tapering. Head, $b^2$, is intermediate the end portions of the stem, and is positioned between members, $b, b'$, said head being provided with means whereby the stem may be fixed relatively to handle, C. Said handle is provided with a chamber, $c$, which opens through one end thereof as at $c'$, the other end of said handle being closed by a solid integral head, $c^2$. The handle is provided with an opening or slot, $d$, which is in communication with chamber, $c$. Within this open end handle, C, is provided with a longitudinal groove, $d'$, which opens into a curved or bayonet shaped groove, $d^2$.

Stem, B, has an interlocking engagement with insulated handle, C. This is secured by the provision of a stud, $e$, protruding outwardly from head, $b^2$. When the stem is to be connected to the handle the tapering member, $b'$, is inserted through the open end, $c'$, of the handle, head, $b^2$, snugly fitting in said open end. The stud, e, passes through groove, d', of the handle, and the stem and handle are turned relatively to each other in order that the stud, e, may enter curved or bayonet shaped groove, $d^2$, whereby the stem is interlocked with said handle, and member, b', of the stem is substantially incased within said handle. For removing the stem from the handle, the parts are turned relatively to each other for the stud, e, to enter straight groove, d', and stem, B, can now be pulled outwardly from handle, C.

An essential feature of the invention consists of means for securing an electric conductor to the stem, B, independently of the attachment of said stem to the insulating handle, C. Said means is shown in Figs. 1 and 2 as consisting of a clamping ring, D, which is loosely fitted on tapering member, b', of the stem. A conductor, E, is adapted to pass through opening or slot, d, of the handle, an end portion of said conductor is passed through the ring, D, after which the ring and the conductor are moved along the tapering member, b', of the stem until said ring clamps an exposed or bare metal portion of the conductor into firm engagement with the stem.

When it is desired to attach an electric conductor, E, to the testing device, stem, B, is turned in handle, C, and pulled outwardly therefrom, thus withdrawing head, $b^2$, and member, b', from said handle. The conductor is now inserted through slot, d, and chamber, c, of handle, C, and the free end of said conductor is passed through ring, D, after which the ring with the conductor looped thereon is moved toward the larger end of member, b', until the conductor is clamped firmly into engagement with said member, thereby securing good electrical contact between the conductor and the stem, B. Conductor, E, is now partly withdrawn from slot, d, of the handle and the stem is again locked therein by inserting member, b', into the handle and turning the stem until its stud, e, engages with the curved groove, $d^2$.

In the practical operation of testing, two of the devices are used, one being connected to the positive terminal or conductor and the other to the negative terminal or conductor of an electric circuit. In this connection it may be proper to remark that the two devices which form the positive and negative terminals of a circuit may be distinguished from each other by any proper construction of the devices or by the employment of indicating characters or symbols thereon; for example, the insulating handle, C, of one device may be colored red to indicate the positive terminal, whereas the corresponding handle of the other device may be colored black to designate the negative terminal. The stems, B, are adapted to be placed on the binding posts of an electric meter for the purpose of conducting current to said meter, or said devices may be used in conjunction with any other form of electric apparatus whereby the presence of a current in a circuit may be ascertained, or the voltage or amperage of the current may be determined; or said devices, or either of them, may be used in various other ways.

The stem shown in Fig. 4 embodies the members, b, b', with an intermediate head, $b^4$, the form of which is somewhat changed from the reduced and shouldered head of Fig. 1. Stud, e, extends directly from head, $b^4$, and it is adapted for interlocking engagement with the handle in the manner heretofore described. Member, b', of the stem is shown as having a knob, f, at its larger end, and around this knob may be passed a half-hitch of the wire or conductor, the free end of said wire or conductor being clamped by ring, D, into engagement with stem, B.

Fig. 5 shows another form of stem, similar to Figs. 1 and 4, but in said Fig. 5 member, b', is provided with a longitudinal bore or passage, g, the latter opening through one side of said member, terminating in an opening, g'. The end portion of a wire or conductor is adapted to pass through passage, g, and opening, g', after which said wire or conductor may be wrapped one or more times around said member, b', and be clamped firmly in position by ring, D.

Fig. 6 shows a further modification of conducting stem, B, wherein the member, b', is divided so that one part, h, of the member is movable with respect to the other part, h'. The member, b', may be elastic or of spring construction, but it is preferred to pivotally connect the movable part, h, to the fixed part, h', by pin, i. The opposing faces of the parts, h, h', composing member, b', may be flat, as shown in Fig. 7, or the part, h', may have a convex face and the part, h, may have a concave face as shown in Fig. 8. A wire or conductor is adapted to be fitted between the opposing faces of parts, h, h', and by adjusting ring, D, the conductor or wire is adapted to be clamped firmly between said parts of the stem.

The handle, C, shown in Figs. 1 and 3, is provided with an opening, d, in communication with chamber, c, through which opening is adapted to pass the wire or conductor, E; but in Fig. 9, I have shown substantially the same form of handle, the opening in which is elongated so as to produce a tapering slot, j, the latter being in communication with chamber, c. The tapered slot is an advantage for the reason that the wire or conductor, E, after its introduction into the handle may be pulled into the narrow part of the slot, j, whereby said wire is adapted to be wedged into the handle instead of passing loosely therethrough as in the construction of Fig. 1.

From the foregoing description taken in connection with the drawings, it will be observed that I have provided various constructions of the current conducting stem whereby a wire or conductor may be attached fixedly to said stem independently of the handle and by devices which secure good electrical contact of the conductor or wire with the stem. It is preferred, for various practical reasons, to employ shiftable ring, D, for the purpose of clamping the wire or conductor into engagement with the current conducting stem, but it is evident that this shiftable ring may be omitted. In one phase of the invention, the wire or conductor may be looped around member, b', with a half-hitch so as to be attached thereto, and, furthermore, various other forms of devices may be employed for clamping the wire or conductor to the stem.

While I have described the device as adapted for use particularly for current testing purposes, it is manifest that said device may be used in many other relations in the electrical art, such for example, as a current conductor, and for plugging in purposes. The new construction whereby electrical conductors may be securely and quickly attached to a metallic stem is a novel feature of this invention, and this construction may be availed of in attaching conductors to plugs generally and, more particularly, to telephone plugs or connections.

Having thus fully described the invention, what I claim as new, and desire to secure by Letters Patent is:

1. A current testing device comprising a single stem having a tapering member, a clamp slidable upon said tapering member and operating to secure a conductor thereto, and an insulated handle inclosing said stem for a part of its length, said handle being fastened to the stem independently of the conductor securing clamp, said stem being exposed for a part of its length beyond the handle and adapted for making electrical contact with the part or device to be tested.

2. A current testing device comprising a stem, means for detachably fastening a conductor to a part of said stem and exteriorly of the stem, and a handle composed of insulating material and fastened detachably to said stem at a point intermediate the ends thereof, said handle inclosing a part of the stem and the conductor fastening means, and the remainder of the stem being exposed beyond said handle for the purpose of making electrical contact with the part or device to be tested.

3. A current testing device comprising a one-piece stem having an integral tapering member, means slidable upon said tapering member for clamping a conductor detachably thereto, and a detachable handle secured to the stem at a point intermediate its ends, said handle inclosing the tapering member and the conductor clamping means, the remainder of the stem being exposed beyond the handle for making electrical contact with the device to be tested.

4. In a current testing device, a one-piece stem provided with an integral tapering member, a ring-like clamp slidable freely on said tapering member and adapted to fasten a conductor thereto, and a handle fastened to said stem at a point intermediate the ends thereof and independently of the clamp, said handle inclosing the tapering part of the stem and the clamp.

5. In a current testing device, a stem provided with a unitary tapering member, a handle, and means operating independently of the handle for detachably clamping a conductor to said stem, said handle being attached to the stem at a point intermediate its ends and operating to inclose the tapering member and the conductor-clamping means.

6. In a current testing device, a one-piece stem provided with a tapering member, a handle, means independent of frictional contact for positively and detachably locking the stem and handle together at a point intermediate the ends of said stem, and means for securing firm engagement of a conductor with said tapering member of the stem, said handle inclosing the tapering member and the conductor securing means.

7. In a current testing device, a one-piece stem composed of two longitudinal members, one of which is tapering, a handle attached to the stem at a point intermediate the members thereof, and inclosing said tapering member, and a slidable clamp movable freely on the tapering stem for clamping a conductor thereto, said clamp operating to retain the conductor in engagement with the stem on the removal of the handle.

8. In a current testing device, a stem composed of a single piece of conducting metal, a handle provided with a slot intermediate its ends, said slot affording means for the insertion and for the free play of a conductor into the handle, and means for securing the conductor to said stem, said handle being detachably fastened to said stem at a point intermediate the ends thereof, whereby the stem may be withdrawn from the handle without disconnecting the conductor therefrom.

9. In a current testing device, a one-piece stem comprising longitudinal members integral with a head intermediate said members, means for securing a conductor to one of said members, and a handle independent of said conductor securing means but incasing the same and, also, one stem member, said handle having detachable interlocking engagement with said head of the stem and one member of said stem being exposed beyond the handle for electrical contact with the device to be tested.

10. A hand tool for ascertaining the presence of a current in an electric circuit, and for analogous purposes, comprising a stem composed of electric conducting material, means for detachably securing a conductor into electrical engagement with the external surface of said stem, and an insulating handle separate from said securing means and detachably affixed to said stem and inclosing the conductor clamping means, said stem being normally exposed for a part of its length beyond the handle and adapted to be brought at will into electrical contact with the device or part to be tested.

11. In a current testing device, a chambered handle closed at one end by a solid head and provided with a tapering slot into which a conductor may be wedged, and a single stem to which said conductor is adapted to be attached, said handle being detachably fastened to said stem intermediate the ends thereof.

In testimony whereof I have signed my name to this specification in the presence of two subscribing witnesses.

HARRY HOUSE MORRELL.

Witnesses:
H. I. BERNHARD,
M. C. POWELL.